(12) United States Patent
di Marco et al.

(10) Patent No.: US 11,115,320 B2
(45) Date of Patent: Sep. 7, 2021

(54) ROUTING IN COMMUNICATION NETWORKS

(71) Applicant: Telefonaktiebolaget LM Ericsson (publ), Stockholm (SE)

(72) Inventors: Piergiuseppe di Marco, Teramo (IT);
Per Skillermark, Årsta (SE);
Jingcheng Zhang, Svärtinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 16/495,001

(22) PCT Filed: Mar. 21, 2018

(86) PCT No.: PCT/SE2018/050289
§ 371 (c)(1),
(2) Date: Sep. 17, 2019

(87) PCT Pub. No.: WO2018/174797
PCT Pub. Date: Sep. 27, 2018

(65) Prior Publication Data
US 2020/0092203 A1    Mar. 19, 2020

Related U.S. Application Data

(60) Provisional application No. 62/476,686, filed on Mar. 24, 2017.

(51) Int. Cl.
*H04L 12/721* (2013.01)
*H04L 29/06* (2006.01)
(Continued)

(52) U.S. Cl.
CPC .............. *H04L 45/36* (2013.01); *H04L 69/22* (2013.01); *H04W 40/02* (2013.01); *H04W 80/04* (2013.01); *H04W 80/06* (2013.01); *H04W 84/18* (2013.01)

(58) Field of Classification Search
None
See application file for complete search history.

(56) References Cited

U.S. PATENT DOCUMENTS 7,649,884 B1    1/2010  Ahmed et al.
2008/0317047 A1  12/2008  Zeng et al.
(Continued)

FOREIGN PATENT DOCUMENTS

EP    1473888 A2    11/2004
EP    1475927 A2    11/2004
(Continued)

OTHER PUBLICATIONS

Khan, Shehroze, "Performance Comparison of Reactive Routing Protocols for Hybrid Wireless Mesh Networks", The 2nd International Conference on Wireless Broadband and Ultra Wideband Communications (AusWireless 2007), IEEE, Aug. 1, 2007, 6 pages.

*Primary Examiner* — Saad Khawar
(74) *Attorney, Agent, or Firm* — Sage Patent Group

(57) ABSTRACT

A node (100) is configured for use in a communication network. The node (100) is configured to obtain a message with a source address and a destination address. The node (100) is also configured to determine whether the message is a type of message that is sent in response to a different message routed from the destination address to the source address, and whether a forward route (16) from the destination address to the source address has been established. The node (100) is also configured to selectively transmit the message on a backward route (18) that is the reverse of the forward route (16), depending on the determining.

13 Claims, 10 Drawing Sheets

(51) Int. Cl.
*H04W 40/02* (2009.01)
*H04W 80/04* (2009.01)
*H04W 80/06* (2009.01)
*H04W 84/18* (2009.01)

(56) References Cited

U.S. PATENT DOCUMENTS

2012/0106552 A1* 5/2012 Iwao .................... H04W 40/02
 370/392
2013/0242929 A1* 9/2013 Gorgen ............. H04W 72/0406
 370/329

FOREIGN PATENT DOCUMENTS

| | | | |
|---|---|---|---|
| EP | 1475927 | A3 | 12/2005 |
| WO | 2012069950 | A1 | 5/2012 |

* cited by examiner

ROUTING IN COMMUNICATION NETWORKS

TECHNICAL FIELD

The application relates generally to a communication network and more particularly to routing in a communication network.

BACKGROUND

Low-power wireless technologies use mesh network topologies to increase the network coverage and flexibility. A mesh network consists of machine devices, for instance sensors and actuators, and relay nodes, which have the capability to forward packets and eventually allow communication among nodes that are outside the radio range of each other.

The simplest and most straightforward networking method is flooding. In a flooding network, each relay that receives a packet will forward it. To avoid loops with infinite retransmissions, restrictions on the number of such transmissions is configured in each message. If a message has been already forwarded or it has been relayed more than a configured number of times (Time-to-Live), the relay discards that message. The flooding method has been proposed to support mesh networking for wireless communication technologies such as the Bluetooth Mesh. This method is robust to changes in the network topology. Also this approach fits well with the characteristics of devices in low power networks, which are usually constrained in terms of memory and computational resources.

An alternative way of delivering packets through multi-hop networks is through routing. In a routing enabled network, a message is forwarded from the source device to the destination devices via a pre-created route. One of the advantages of a routing network is that the packets are only sent on one route from the source to the destination. Only the devices on the route are involved in forwarding the packet. This means that unnecessary packets created in the network by flooding can be avoided, the interference is reduced and the network throughput will increase. However, discovery and maintenance of routes introduces additional complexity, message overhead, resource inefficiency, and latency. This added complexity, overhead, inefficiency, and latency proves problematic especially in contexts where the resources are constrained and/or high performance is expected.

SUMMARY

One or more embodiments herein exploit the nature of a message as being a response to a message that was routed on a forward route in a communication network, in order to route the response on a backward route that is the reverse of the forward route. One embodiment, for example, routes a positive or negative acknowledgement (ACK or NACK) on the reverse of the forward route over which the message being acknowledged was routed. In any event, determining the backward route may in some embodiments advantageously be performed by simply reversing the forward route, without having to discover the backward route. Indeed, the backward route is understood as being a valid route, based on reception of the message routed on the forward route.

More particularly, embodiments herein include a method performed by a node configured for use in a communication network (e.g., a mesh network). The method comprises obtaining a message with a source address and a destination address. The method also comprises determining whether the message is a type of message (e.g., an ACK or NACK) that is sent in response to a different message routed from the destination address to the source address, and whether a forward route from the destination address to the source address has been established. The method also comprises selectively transmitting the message on a backward route that is the reverse of the forward route, depending on the determining.

In some embodiments, the method further comprises determining the type of the message based on one or more header fields of the message. The header field(s) may for instance be unencrypted, e.g., to allow the node to read the field(s) upon interception of the message.

In some embodiments, determining whether the message is a type of that is sent in response to a different message routed from the destination address to the source address comprises determining whether the message is an acknowledgement message that positively or negatively acknowledges the different message.

In some embodiments, the forward route is established by a first protocol layer of the node, and a second protocol layer of the node that is lower than the first protocol layer determines whether to transmit the message on the backward route. In one embodiment, for example, the first protocol layer is an Upper Transport layer according to a Bluetooth Mesh protocol and the second protocol layer is a Network layer according to the Bluetooth Mesh protocol.

In any of these embodiments, the message may be a message of a Lower Transport Layer according to a Bluetooth Mesh Protocol. Alternatively or additionally, the message may be a Segment Acknowledgement that positively or negatively acknowledges a segmented message of a Lower Transport Layer according to a Bluetooth Mesh Protocol.

In some embodiments, the method further comprises preferentially transmitting the message on a forward route from the source address to the destination address, instead of the backward route, if the forward route from the source address to the destination address has been established.

Alternatively or additionally, the method may further comprise determining the backward route by reversing the established forward route from the destination address to the source address, instead of performing discovery of the backward route.

In some embodiments, the method further comprises refraining from storing the backward route in a routing table.

In some embodiments, selectively transmitting the message comprises transmitting the message on the backward route responsive to determining that the message is said type of message, and that the forward route from the destination address to the source address has been established.

In some embodiments, selectively transmitting the message may comprise transmitting comprises transmitting the message on the backward route, or flooding the message, depending on the determining. In other embodiments, selectively transmitting the message may comprise transmitting the message on the backward route, or discarding the message, depending on the determining.

In some embodiments, the node is addressed by the source address. In this case, obtaining the message may comprise generating the message in response to the node receiving the different message from the destination address.

In other embodiments, the node is an intermediate relay node that is on the forward route and the backward route and that is addressed by neither the source address nor the destination address. In this case, obtaining the message may comprise receiving the message from another node and transmitting the message on the backward route may comprise relaying the message along the backward route.

Embodiments herein also include a node configured for use in a communication network. The node is configured to obtain a message with a source address and a destination address. The node is also configured to determine whether the message is a type of message (e.g., an ACK or NACK) that is sent in response to a different message routed from the destination address to the source address, and whether a forward route from the destination address to the source address has been established. The node may also be configured to selectively transmit the message on a backward route that is the reverse of the forward route, depending on the determining.

The node may also be configured to perform the method of any of the embodiments above.

A node configured for use in a communication network according to other embodiments comprises communication circuitry and processing circuitry wherein the node is configured to obtain a message with a source address and a destination address, determine whether the message is a type of message (e.g., an ACK or NACK) that is sent in response to a different message routed from the destination address to the source address, and whether a forward route from the destination address to the source address has been established, and selectively transmit the message on a backward route that is the reverse of the forward route, depending on the determining.

The node may comprise communication circuitry and processing circuitry wherein the node is configured to perform the method of any of the embodiments above.

Embodiments further include a computer program comprising instructions which, when executed by at least one processor of a node, causes the node to carry out the method of any of the embodiments above. Other embodiments include a carrier containing such a computer program. The carrier may be one of an electronic signal, optical signal, radio signal, or computer readable storage medium.

One or more embodiments herein also include a mechanism to enable backward routing for end-to-end acknowledgment messages. The mechanism may be applied for instance to Segment Acknowledgment in Bluetooth Mesh networks.

DETAILED DESCRIPTION

Figure 1A:
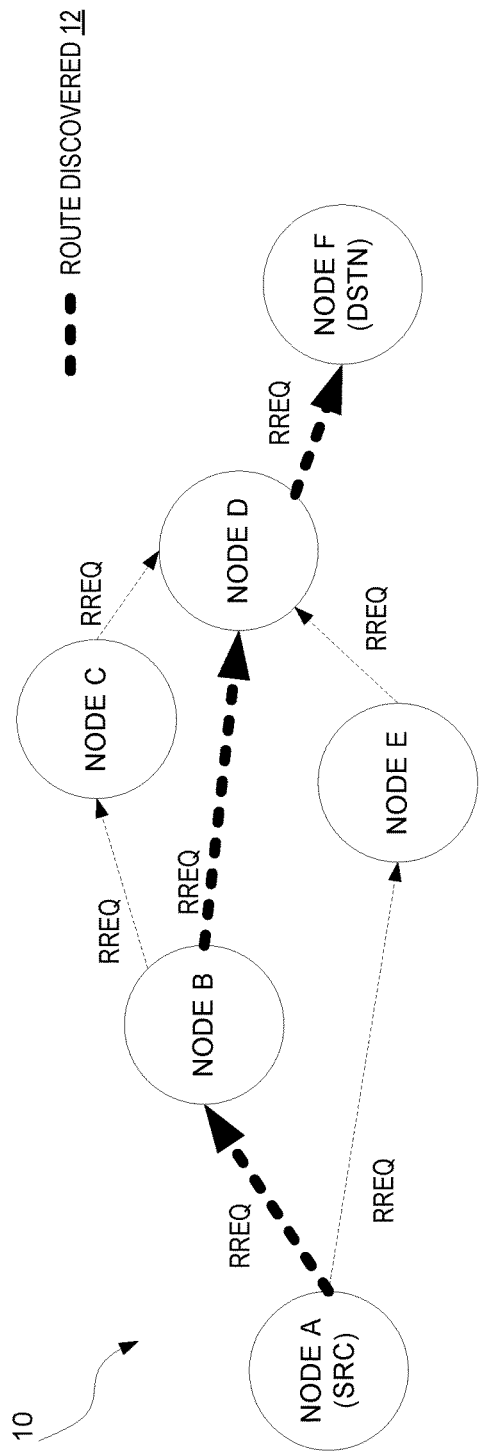
FIG. 1A is a block diagram of a communication network in which a route request is sent for discovering a route according to some embodiments.
Figure 1B:
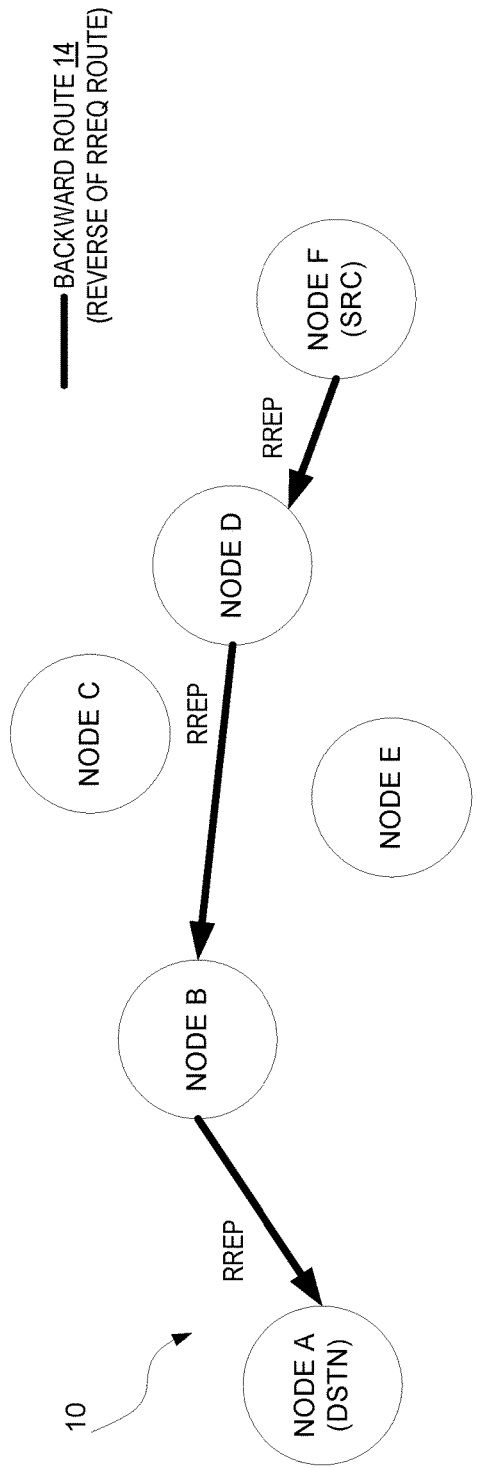
FIG. 1B is a block diagram of a communication network in which a route reply is sent in response to the route request of FIG. 1A, according to some embodiments.

FIGS. 1A-1B illustrate route discovery in a communication network 10 (e.g., a mesh network) according to some embodiments. As shown, the communication network 10 includes Nodes A-F. Node A initiates discovery of a route 12 to Node F by multi-casting or broadcasting a route request (RREQ) to neighboring nodes B and E. Indeed, without knowledge of an established route to Node F, Node A cannot of course route such a route request to Node F. The route request RREQ includes information indicating Node A's address as the source of the route to be discovered, and Node F's address as the destination of the route to be discovered. In some embodiments, Node B receives the route request RREQ, records a reverse route back to Node A, stores information indicating that the reverse route is associated with the particular route request RREQ, and multi-casts or broadcasts the route request RREQ again. Nodes C, D, and E do the same. When Node F receives a route request RREQ, e.g., from Node D as shown in FIG. 1A, Node F identifies itself as the destination of the route to be discovered, and correspondingly stops the propagation of the received RREQ. In this way, a route 12 is discovered from Node A as the source, through Nodes B and D, to Node F as the destination.

As shown in FIG. 1B, Node F returns a route response RREP back (e.g., via unicast), in order to indicate the discovered route 12 to Node A and to the intermediate nodes on that route 12 (i.e., Nodes B and D). The route response RREP includes information indicating that it is a response to the route request RREQ. FIG. 1B in this regard shows that Node F transmits the route response RESP on a backward route 14 that is the reverse of the route 12 taken by the route request RREQ. The route response RESP is transmitted on this backward route 14 with Node F's address as the source and Node A's address as the destination. Upon receiving the RREP, for example, Node D may identify the reverse route associated with the route request RREQ for which the route response RREP is a response, and transmit the route response RREP on that reverse route. Node B may do the same. Nodes A, B, and D may each store an entry in a routing table at the node that indicates the discovered route 12 from Node A through Nodes B and D to Node F. The routing table entry in this regard may include both Node A's address as the source address and Node F's address as the destination address, i.e., both source and destination addresses are included in a routing table entry.

Of course, FIGS. 1A and 1B illustrate just one approach to discovering a route from Node A to Node F. Other approaches are contemplated herein.

Figure 2A:
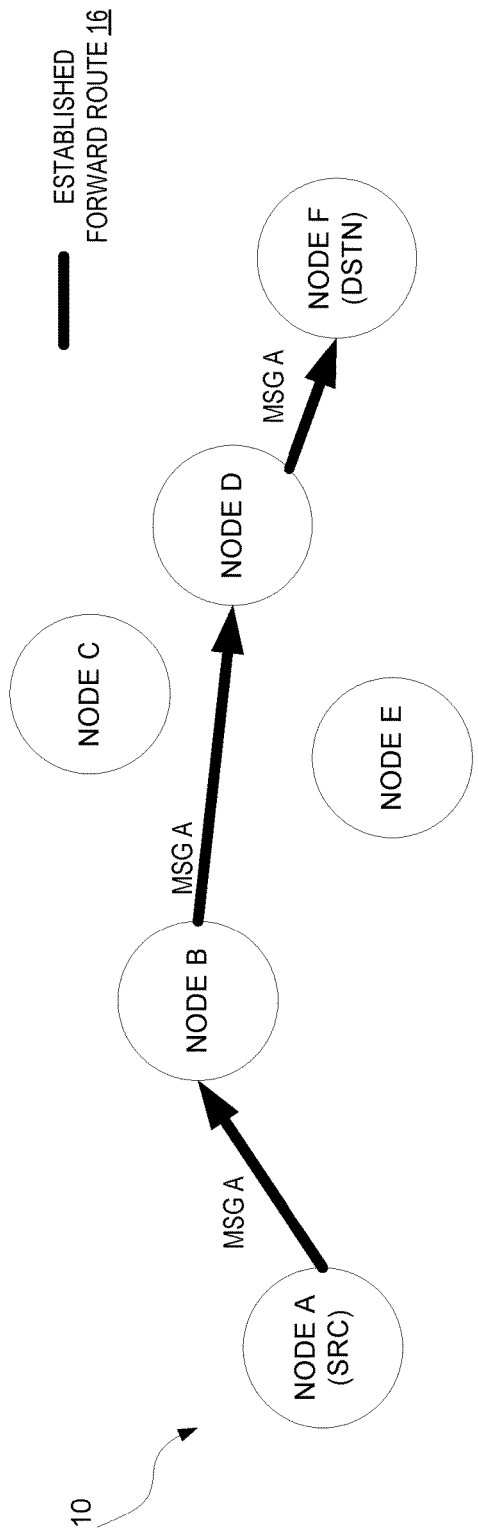
FIG. 2A is a block diagram of a communication network in which a message is transmitted on a forward route that has been established according to some embodiments.

No matter the particular approach used to discover the route 12 from Node A to Node F, FIG. 2A illustrates that, after the route discovery, Node A may later transmit a message MSG A to Node F on the discovered route 12, i.e., from Node A through Nodes B and D to Node F. The message MSG A accordingly has Node A's address as its source and Node F's address as its destination. However, rather than multi-casting or broadcasting that message MSG A, the message is routed on the previously discovered route 12. Nodes B and D for instance route the message MSG A using the route identified by a routing table entry that is indexed with the combination of Node A's address as the source address and Node F's address as the destination address. With the message MSG A routed in this way, the route is established as a forward route 16 from Node A's address as the source to Node F's address as the destination.

Figure 2B:
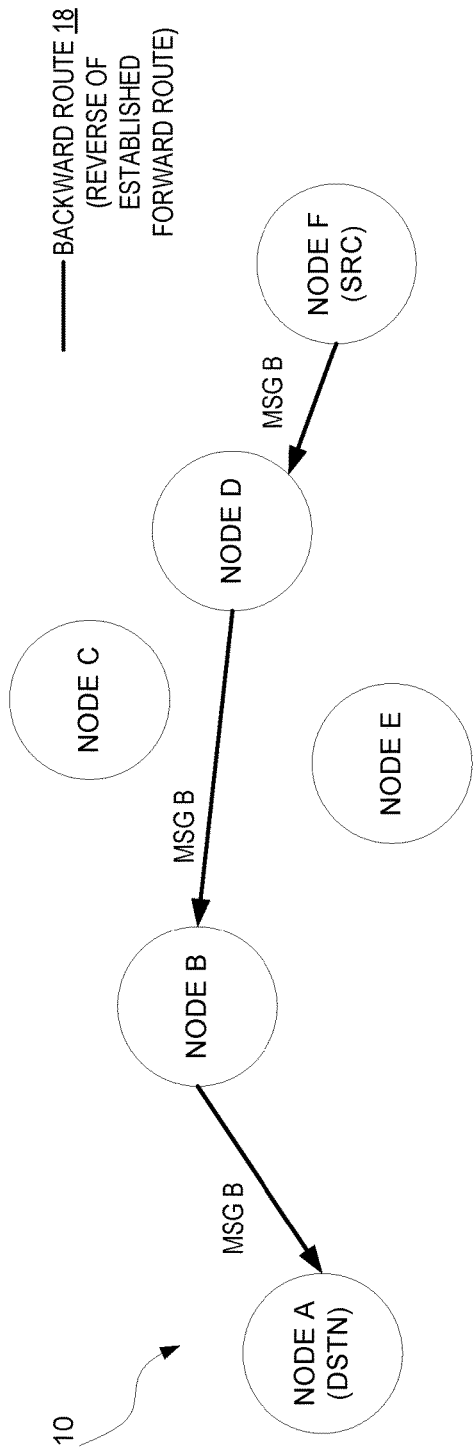
FIG. 2B is a block diagram of a communication network in which a response to the message of FIG. 2A is sent on a backward route according to some embodiments.

According to one or more embodiments herein shown in FIG. 2B, Node F transmits a response to message MSG A on a backward route 18 that is the reverse of the forward route 16 on which Node F received message MSG A. FIG. 2B shows this response as being a different message MSG B that has Node F as its source address and Node A as its destination address. The intermediate nodes on the backward route, including Nodes D and B, likewise transmit the response on the backward route 18, in order to return the response to Node A. The Nodes B, D, and F may identify the backward route 18 by simply reversing the forward route 16 on which message MSG A was received, as opposed to for instance initiating route discovery (e.g., as in FIGS. 1A-1B) back to Node A as the destination. This reduces complexity, overhead, resource usage, and/or latency in some embodiments. The identified backward route 18 may thereafter be stored in a routing table according to some embodiments, but does not have to be. That is, in other embodiments, a node refrains from storing the backward route 18 in its routing table, e.g., but instead re-generated on-demand from a corresponding forward route 16 as needed.

Notably, in at least some embodiments, Nodes B, D, and F perform backward routing selectively for one or more certain types of messages that are responses to routed messages. The one or more certain types of messages may include for instance acknowledgement messages (e.g., ACKs or NACKs), status messages that are requested, solicited messages that are explicitly solicited by a request, or any other type of message whose transmission is triggered by the receipt of a routed message. Accordingly, Nodes B, D, and F may perform backward routing for some message types but not others. For example, Node F may initiate route discovery or perform flooding for transmitting a different type of message (e.g., message MSG C), even if that different type of message has Node A's address as its destination.

Indeed, one or more embodiments herein exploit the nature of a message as being a response to a message that was routed on a forward route 16, in order to route the response on a backward route 18 that is the reverse of the forward route 16. One embodiment, for example, routes a positive or negative acknowledgement (ACK or NACK) on the reverse of the forward route 16 over which the message being acknowledged was routed. The backward route 18 in this case is understood as being a valid route, based on reception of the message routed on the forward route 16. In some embodiments, then, the backward route 18 is advantageously determined by reversing the established forward route 16 from the destination address to the source address, instead of performing discovery of the backward route 18. This may reduce the complexity, overhead, inefficiency, and latency associated with sending the response on the backward route 18.

Figure 3A:
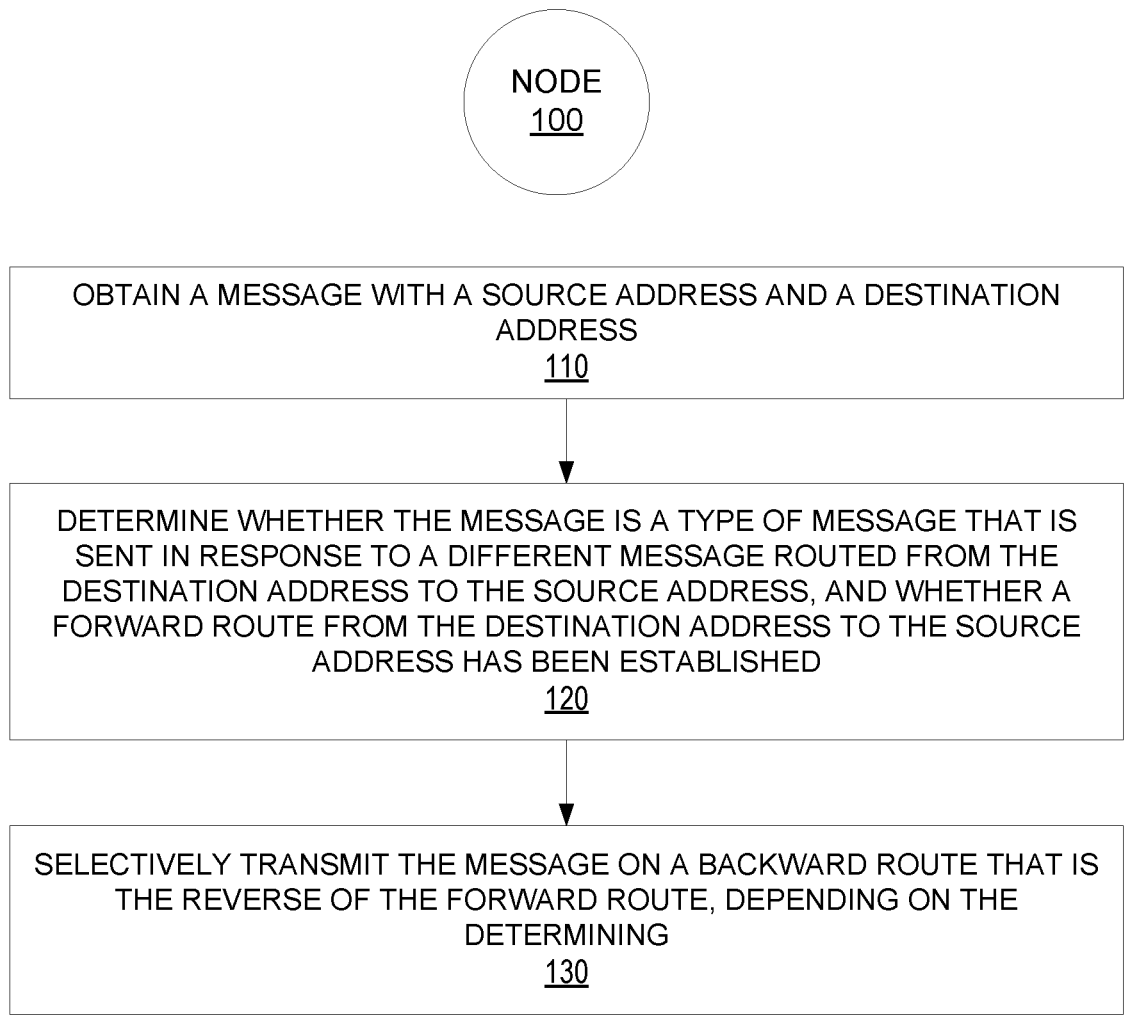
FIG. 3A is a logic flow diagram of a method performed by a node configured for use in a communication network according to some embodiments.

With this understanding, FIG. 3A generally illustrates a method performed by a node 100 configured for use in a communication network 10 according to some embodiments. The method as shown comprises obtaining a message (e.g., MSG B) with a source address (e.g., Node F's address) and a destination address (e.g., Node A's address) (Block 110). The method also comprises determining whether the message is a type of message (e.g., ACK or NACK) that is sent in response to a different message routed from the destination address to the source address, and whether a forward route 16 from the destination address to the source address has been established (Block 120). The method further comprises selectively transmitting the message on a backward route 18 that is the reverse of the forward route 16, depending on the determining (Block 130).

Figure 3B:
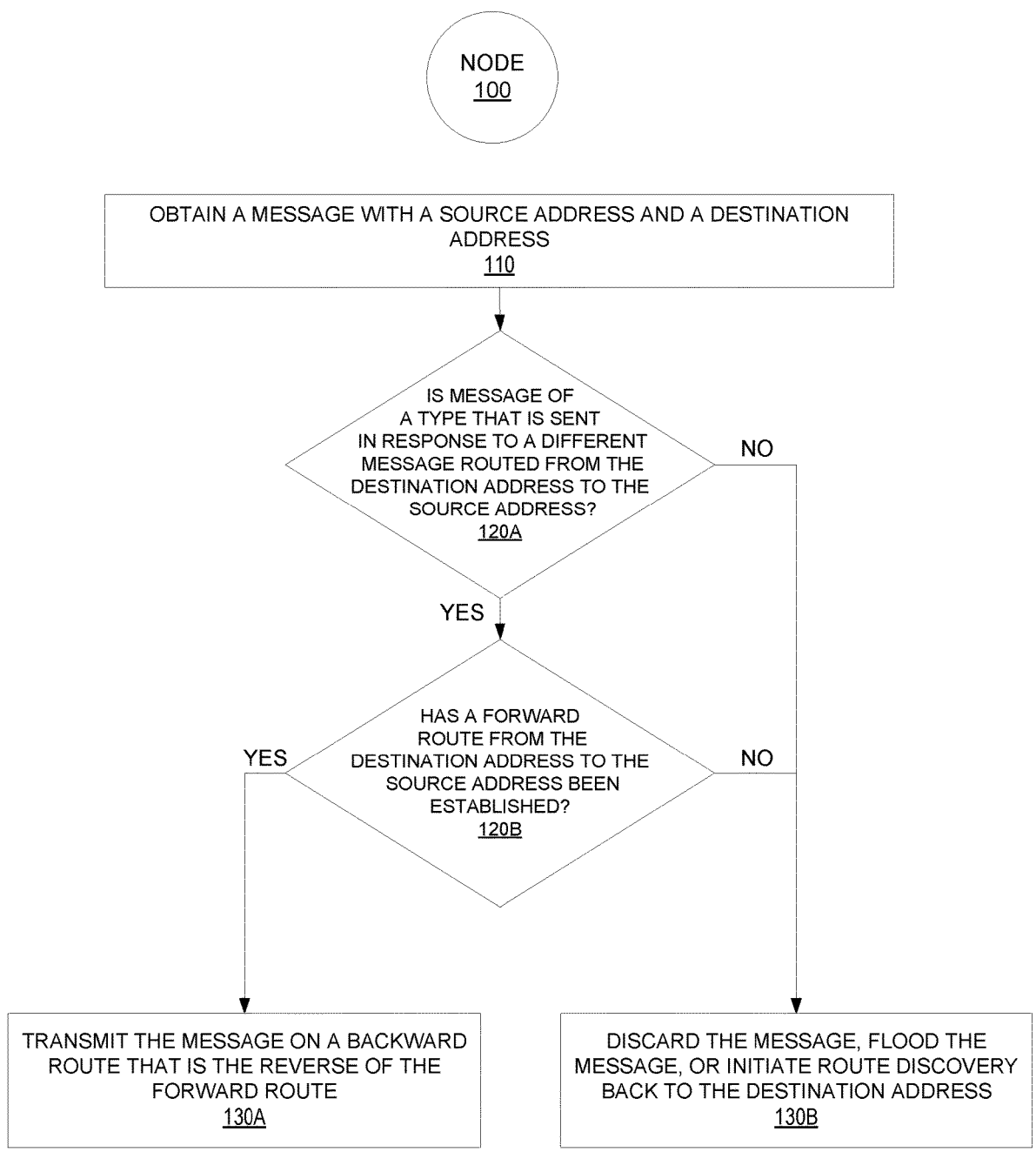
FIG. 3B is a logic flow diagram of a method performed by a node configured for use in a communication network according to other embodiments.

For example, the method may comprise transmitting the message on the backward route 18 if the message is a type of message (e.g., ACK or NACK) that is sent in response to a different message routed from the destination address to the source address, and a forward route 16 from the destination address to the source address has been established. Otherwise, the method may comprise discarding the message, flooding the message, initiating route discovery back to the destination address, or performing some other action that does not exploit the backward route 18. FIG. 3B shows additional details of such embodiments.

As shown, for example, the node 100 in these embodiments determines whether the obtained message is of a type that is sent in response to a different message routed from the destination address to the source address (Block 120A). If not (NO at Block 120A), the node 100 discards the message, floods the message, or initiates route discovery back to the destination address (Block 130B). If so, though, (YES at Block 120A) the node 100 determines whether a forward route 16 from the destination address to the source address has been established, e.g., by inspecting a routing table at the node 100 (Block 120B). If not (NO at Block 120B), the node 100 discards the message, floods the message, or initiates route discovery back to the destination address (Block 130B). If so, though, (YES at Block 120B) the node 100 transmits the message on a backward route 18 that is the reverse of the forward route 16 (Block 130A).

Figure 4:
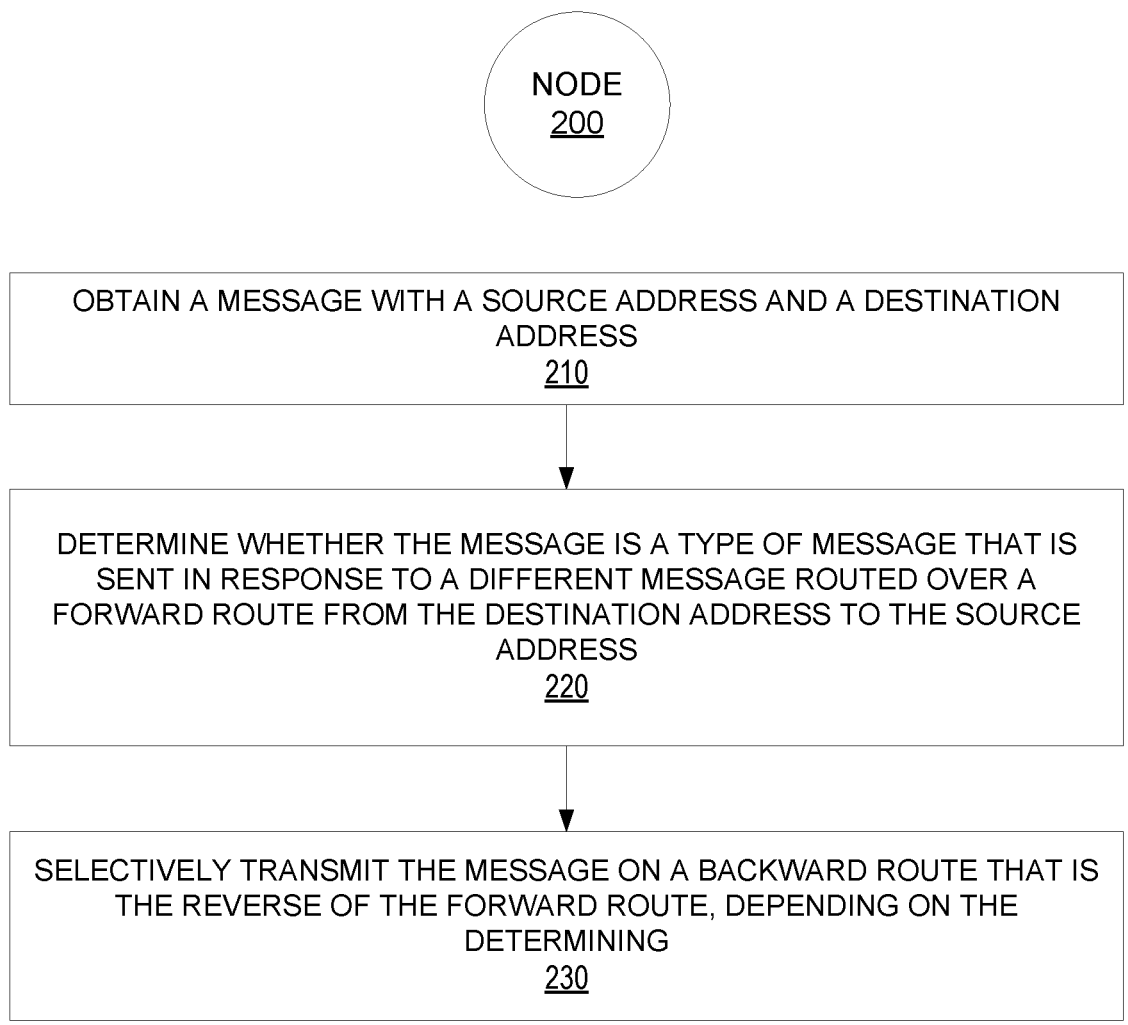
FIG. 4 is a logic flow diagram of a method performed by a node configured for use in a communication network according to yet other embodiments.

FIG. 4 generally illustrates a method performed by a node 200 configured for use in a communication network 10 according to other embodiments. The method as shown comprises obtaining a message (e.g., MSG B) with a source address (e.g., Node F's address) and a destination address (e.g., Node A's address) (Block 210). The method also comprises determining whether the message is a type of message (e.g., ACK or NACK) that is sent in response to a different message routed over a forward route 16 from the destination address to the source address (Block 220). The method further comprises selectively transmitting the message on a backward route 18 that is the reverse of the forward route, depending on the determining (Block 230).

For example, the method may comprise transmitting the message on the backward route 18 if the message is the type of message (e.g., ACK or NACK). Otherwise, the method may comprise discarding the message, flooding the message, initiating route discovery back to the destination address, or performing some other action that does not exploit the backward route 18.

The node 100, 200 that implements the respective methods in FIGS. 3 and 4 may be for instance identified by the source address, e.g., so as to be the source of the message transmitted on the backward route 18. In this case, then, the node 100, 200 may obtain the message by generating the message in response to the node 100, 200 receiving the different message from the destination address.

In other embodiments, the node 100, 200 that implements the respective methods in FIGS. 3 and 4 may be an intermediate relay node that is on the forward route 16 and the backward route 18 and that is addressed by neither the source address nor the destination address. In this case, the node 100, 200 may obtain the message by receiving the message from another node and may transmit the message on the backward route 18 by relaying the message along the backward route 18.

In some embodiments, the methods in FIGS. 3 and 4 each also comprises determining the type of the message based on one or more header fields of the message. The header field(s) may be unencrypted, e.g., so as to be accessible to intermediate relay nodes on the backward route 18.

In any of these embodiments, the forward route 16 may be established by a first protocol layer of the node 100, 200, and a second protocol layer of the node 100, 200 that is lower than the first protocol layer may determine whether to transmit the message on the backward route 18. The first protocol layer may be for instance an Upper Transport layer according to the Bluetooth Mesh Protocol, and/or the second protocol layer may be a Network layer according to the Bluetooth Mesh Protocol. Alternatively or additionally, the message selectively transmitted on the backward route 18 may be a message of a Lower Transport layer according to the Bluetooth Mesh Protocol. The message may be for instance a Segment Acknowledgement that positively or negatively acknowledges a segmented message of the Lower Transport Layer.

One or more additional embodiments in this regard will now be described, which may be implemented separately from or in combination with the above embodiments.

Figures 5, 6:
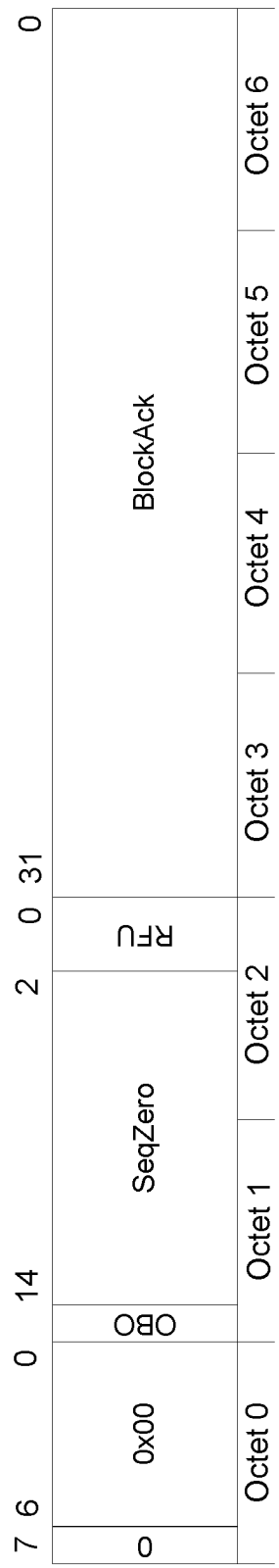
FIG. 5 is a block diagram of a Bluetooth Mesh protocol stack according to some embodiments.
FIG. 6 is a block diagram of a Segment Acknowledgement message protocol data unit (PDU) according to some embodiments.

Routing discovery and maintenance operations may be run as part of a transport layer feature on top of the baseline forwarding mechanism. As an exemplificative use case, FIG. 5 summarizes layers and functionalities in the Bluetooth Mesh protocol stack.

The application layer 20 generates data messages associated with pre-defined Bluetooth Models. The upper transport layer 22 provides encryption and authentication of application messages, together with control features. The routing feature provides services of route discovery and maintenance at the upper transport layer 22, defining Transport Control Messages for its operations. The lower transport layer 24 provides segmentation and reassembly functionalities, including the transmission of end-to-end Segment Acknowledgment messages to acknowledge the reception of segmented messages. The network layer 26 takes care of forwarding messages through the appropriate bearer 28. If routing is enabled, only messages that belong to a known route are forwarded by the network layer 26.

If routing is enabled, the upper transport layer 22 of a node that wants to send application messages to a target destination shall check if a route is known. If no route is known, the node shall initiate a route discovery procedure for the target destination. This is the baseline mechanism for reactive routing. A route discovery procedure finds a valid path between source and destination. This procedure is initiated on an on-demand basis by the source by multicasting a Route Request message (RREQ), e.g., as shown in FIG. 1A. The route is made available by unicasting a Route Reply message (RREP) back to the source, e.g., as shown in FIG. 1B. Each node receiving the RREQ temporarily stores information of a route back to the source so that the RREP can be unicast along the backward route. Each node receiving the RREP permanently (or semi-permanently) stores information of the route towards the destination (forward route), which shall be used later by the source and the intermediate relays to forward messages addressed to the destination.

To realize segment acknowledgment in Bluetooth Mesh, the lower transport layer 24 of Bluetooth Mesh uses the Segment Acknowledgment message to acknowledge segments received by a peer lower transport layer. The Segment Acknowledgment message protocol data unit (PDU) is shown in FIG. 6. This PDU is identified by the Transport Opcode 0x00. An OBO field is set to 0 by a node that is directly addressed by the received message and is set to 1 by a friend node that is acknowledging the message on behalf of a low power node. The SeqZero field is set to the SeqZero field of the upper transport layer message being acknowledged. The RFU field is reserved for future use. The BlockAck field is set to indicate the segments received, i.e., acknowledged. The least significant bit, bit 0, represents segment 0 and the most significant bit, bit 31, represents segment 31. If bit n is set to 0, then segment n is not being acknowledged. This is a control message sent without encryption and authentication in the higher layers.

Figure 7:
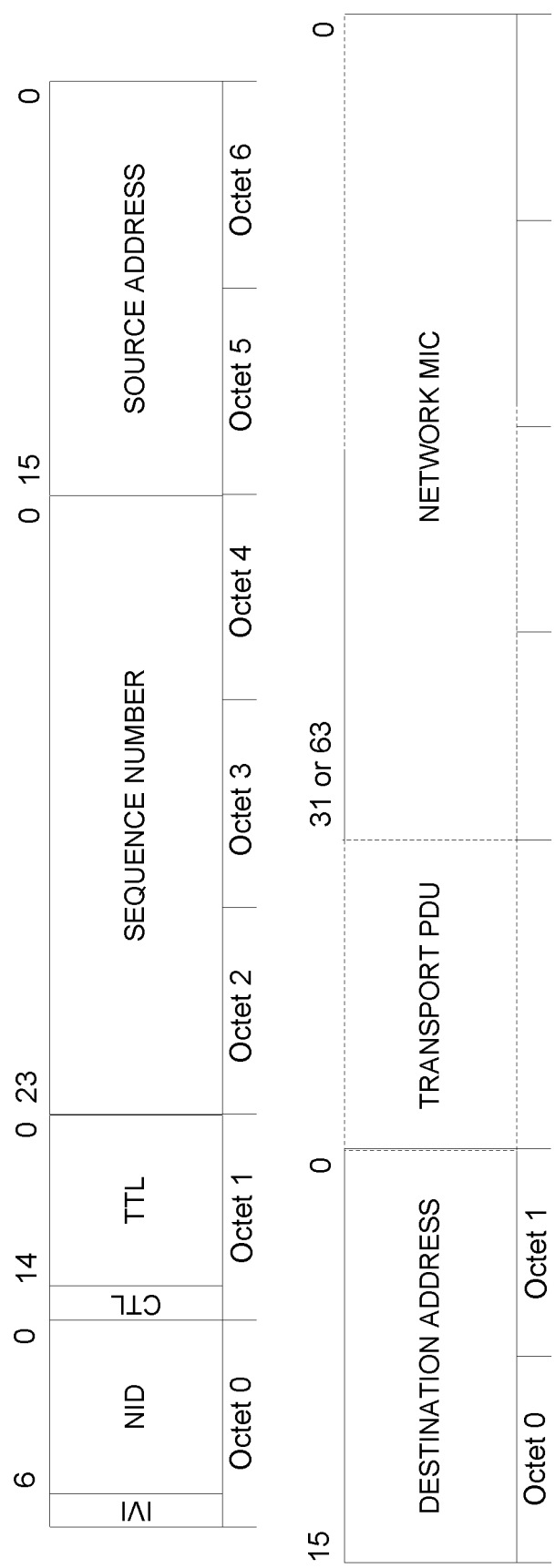
FIG. 7 is a block diagram of a network layer protocol data unit (PDU) according to some embodiments.

FIG. 7 shows a network layer PDU. The PDU includes an IVI field which contains the least significant bit of the IV Index used in the nonce to authenticate and encrypt the Network PDU. An NID field contains a 7-bit network identifier that allows for lookup of the Encryption Key and Privacy Key used to authenticate and encrypt the Network PDU. The CTL field is a 1-bit value that is used to determine if the message is part of a control message or an access message. If the CTL field is set to 0, the Lower Transport PDU in some embodiments contains an access message whereas if the CTL field is set to 1, the Lower Transport PDU contains a control message. The time-to-live (TTL) field indicates whether or not the message has been or can/will be relayed. The Sequence Number field (when combined with the IV Index) is a unique value for each new Network PDU originated by the node. The Source Address (SRC) field identifies the element that originated the Network PDU. The Destination Address (DST) field identifies the element(s) that the Network PDU is directed towards. The Transport PDU field, from a network layer point of view, is a sequence of octets of data. When the CTL bit is 0, the Transport PDU in some embodiments is a maximum of 128 bits, whereas when the CTL bit is 1 the Transport PDU is a maximum of 96 bits. The Transport PDU is set by the originating lower transport layer. The Network MIC field is a 32-bit or 64-bit field (depending on the value of the CTL field) that authenticates that the Destination Address and Transport PDU have not been changed.

In many technologies, routing is designed and implemented as a network-layer functionality, with the routing decision taken at each hop, based on the existence of a route towards the destination. The routing scenario described in some embodiments is different, since routing entries include both source and destination addresses and the decision to initiate a route discovery is done at higher layers (e.g., the upper transport layer). There are messages that are generated at lower layers (e.g., the Segment Acknowledgment is generated and processed by the lower transport layer). For those messages, there are no standardized ways to enable routing. Thus, Segment Acknowledgment messages sent in response to a segmented message cannot be routed in the network.

One solution to the problem is to automatically enable route discovery procedures from the destination back to the source, for all source-destination pairs. However, this may be inefficient in terms of use of resources, since application layer traffic is typically asymmetric and relays would have to store backward routes even if they are not used. There is control message overhead associated with this solution that increases the setup time and latency. Moreover, it is problematic to maintain routes that are not used to send application layer messages, but only Segment Acknowledgments by the Lower Transport layer.

Some embodiments propose a mechanism to enable backward routing for end-to-end acknowledgment messages. This mechanism may be applied for instance to Segment Acknowledgment in Bluetooth Mesh networks.

One or more embodiments in this regard configure the network layer of a node to enable backward routing for acknowledgment messages if there is a forward route from the node to the node that is the source of the acknowledgement messages. This is possible in some embodiments thanks to the presence of both source and destination addresses in the routing table entries of Bluetooth Mesh. Although applicable to Bluetooth Mesh, some embodiments extend to other technologies, e.g., any other technology with source and destination address in routing table entries, or any other technology in which a backward route can be determined (e.g., without route discovery).

Then, intermediate relays will be configured to forward packets if both the following conditions apply: (1) there is a backward routing entry corresponding to the source-destination pair in the message; and (2) unencrypted fields in the message header identify the message as an acknowledgment message (i.e., CTL set to 1 and lower transport PDU Opcode set to 0x00 in Bluetooth Mesh). Some embodiments herein thereby discriminate between whether or not to use backward routing depending on unencrypted message header fields.

Compared to the approach of automatically enabling route discovery procedures from the destination back to the source, some embodiments advantageously enable backward routing from the destination without increasing the message overhead and memory consumption at intermediate relays.

Note that some embodiments avoid using existing forward routes to relay all backward traffic from the destination. Indeed, some embodiments deem backward routes as not reliable for unsolicited messages generated by the destination. For the source node, a route is considered because a RREP is received by the destination, following a RREQ. From the destination side, the transmission of a RREP does not guarantee the establishment of a valid route towards the source. However, since acknowledgment messages are only sent in response to a solicitation message, the backward route is implicitly validated by the reception of such a solicitation message.

Some embodiments describe the behavior of the network-layer of a node when operating as a source of a message or a relay for that message. In these embodiments, it is assumed that routing discovery and establishment is performed at a higher layer (e.g., Upper Transport layer in Bluetooth Mesh). A routing table entry contains addresses of the source and the destination(s) for which forwarding is allowed. Source and destination are marked as SRC and DST fields and messages are sent without an explicit next-hop indication. Moreover, it is assumed that the source node chooses an alternative forwarding mechanism (e.g., flooding) when routes are not available.

A forward route may be defined as a routing entry matching SRC and DST fields in the message. A backward route may be defined as a routing entry matching source with the DST field and destination with the SRC field in the message. A route is established as used herein when at least one message has been delivered using routing over the route. For ACKs, that is always the case as ACKs are sent in response to a message that is delivered using routing over a route. That is, for an ACK, a forward route from the destination of the ACK to the source of the ACK will always have been established since the message triggering the ACK will have been delivered using routing over that forward route.

Figure 8:
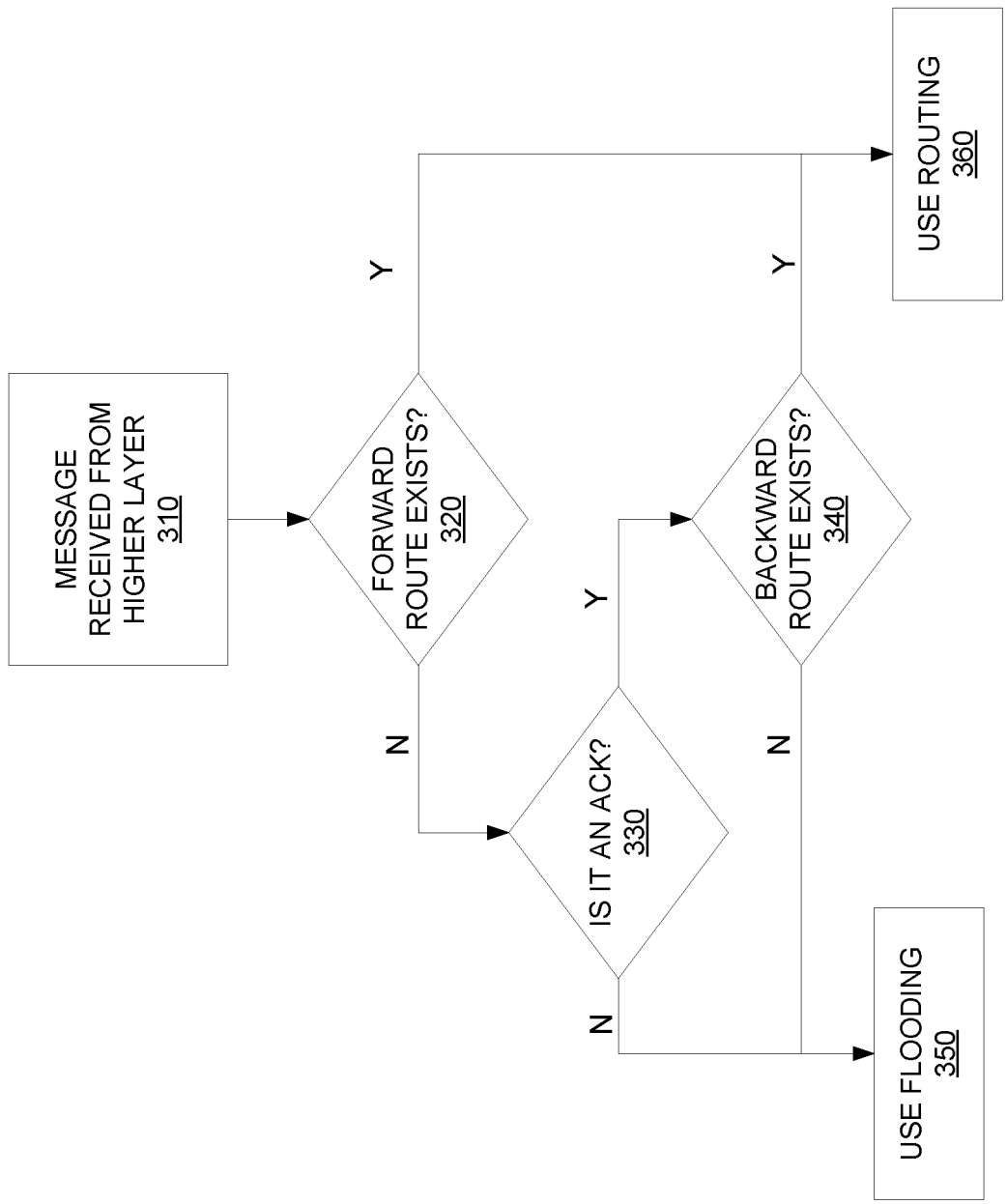
FIG. 8 is a logic flow diagram of a method performed by a source node that is the source of a message according to some embodiments.

FIG. 8 shows the network layer behaviour of a source node according to some embodiments. Upon reception from a higher layer of a message to be sent from a source to a destination (Block 310), the network layer of the source node checks if a forward route has been established for the source-destination pair from the source to the destination (Block 320). If so (Y at Block 320), the message is transmitted on that forward route using routing (Block 360). In some embodiments, then, the source node preferentially transmits the message on a forward route from the source address to the destination address, instead of a backward route, if such a forward route has been previously established (e.g., via discovery). If no forward route from the source to the destination exists (N at Block 320), but the message is an acknowledgment of a routed message (Y at Block 330) and a backward route exists (Y at Block 340), the message is transmitted on that backwards route using routing (Block 360). A determination may be made that a backward route exists, for instance, if a forward route from the message's destination to the message's source exists (e.g., in the source node's routing table), such that a backwards route may be determined as the reverse of that forward route. Otherwise, the message is flooded in the network (Block 350).

Figure 9:
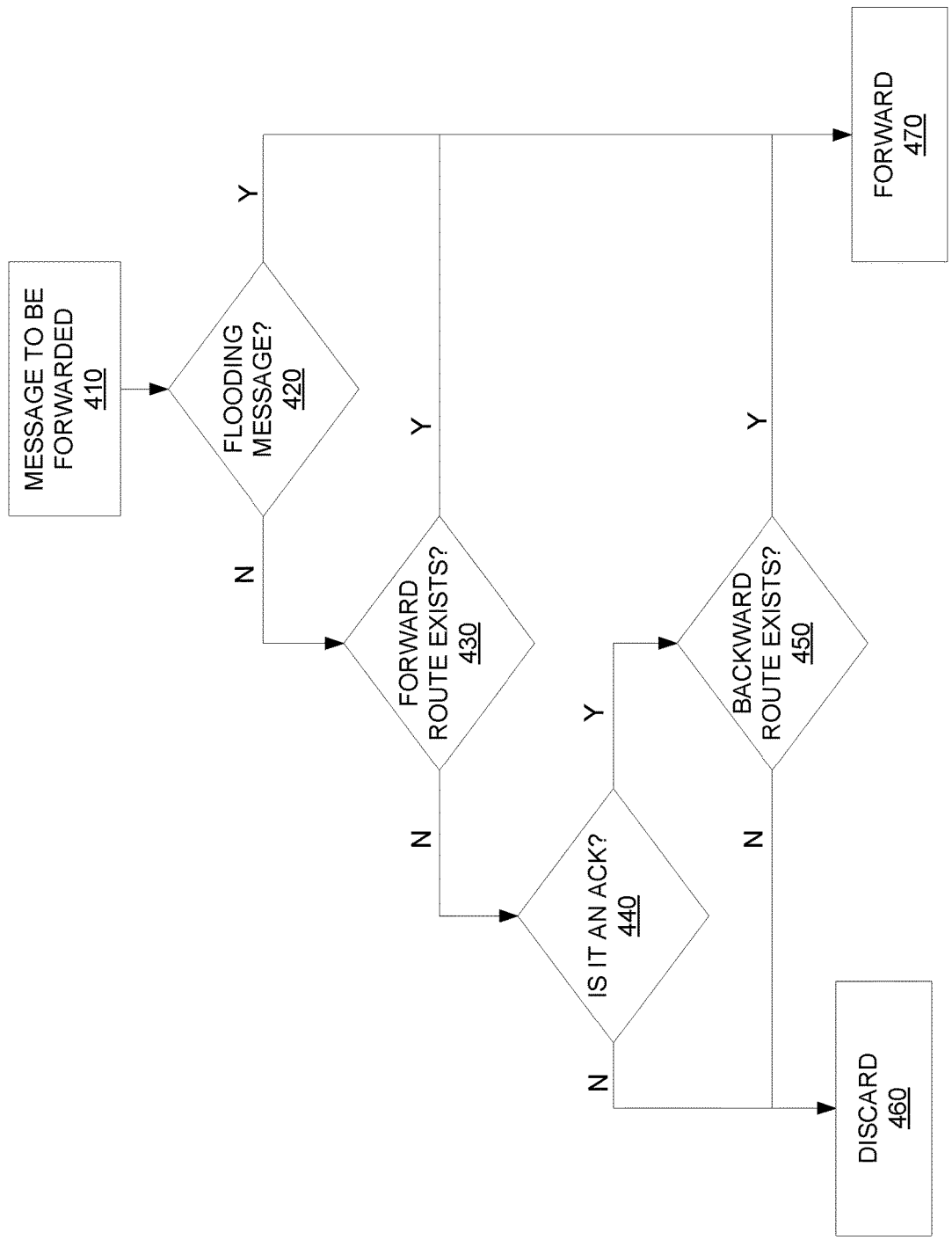
FIG. 9 is a logic flow diagram of a method performed by a relay node that is to relay a message according to some embodiments.

FIG. 9 shows corresponding network layer behaviour of a relay node according to some embodiments. Upon reception of a message to be forwarded towards a destination (Block 410), the network layer of the relay node checks if the message is marked to be flooded (Block 420). If so (Y at Block 420), the message is forwarded (Block 470). If the message is to be routed (N at Block 420), and a forward route towards the destination exists (Y at Block 430), the message is forwarded (Block 470). Or, if the message is to be routed (N at Block 420) and a forward route towards the destination does not exist (N at Block 430), but the message is an acknowledgment (Y at Block 440) for which a backward route exists (Y at Block 450), the message is forwarded (Block 470). A determination may be made that a backward route exists, for instance, if a forward route from the message's destination to the message's source exists (e.g., in the relay node's routing table), such that a backwards route may be determined as the reverse of that forward route. Otherwise, the message is discarded (Block 460).

In view of the above, some embodiments herein generally include a mechanism to discriminate when to use backward routing or not depending on unencrypted message header fields.

Despite explanation in the context of Bluetooth Mesh in some embodiments, it will be appreciated that the techniques may be applied to other wireless networks. Thus, references herein to signals using terminology from the Bluetooth standards should be understood to apply more generally to signals having similar characteristics and/or purposes, in other networks.

A node discussed herein is any type of node capable of communicating over wired or wireless signals. The node in some embodiments is a radio node, which is any type of node capable of communicating over radio signals. A radio node may be for example a radio network node or a user equipment. A radio network node herein is any type of network node (e.g., a base station) capable of communicating with another node over radio signals. A user equipment is any type device capable of communicating with a radio network node or another user equipment over radio signals. A user equipment may therefore refer to a machine-to-machine (M2M) device, a machine-type communications (MTC) device, a NB-IoT device, etc. A user equipment may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be UEs, but are generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

Note that the node 100 in FIGS. 3A-3B or the node 200 in FIG. 4 may perform the processing herein by implementing any functional means or units. In one embodiment, for example, the node 100 or 200 comprises respective circuits configured to perform processing herein, e.g., the steps shown in any of FIGS. 3A-3B and 4. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 10B:
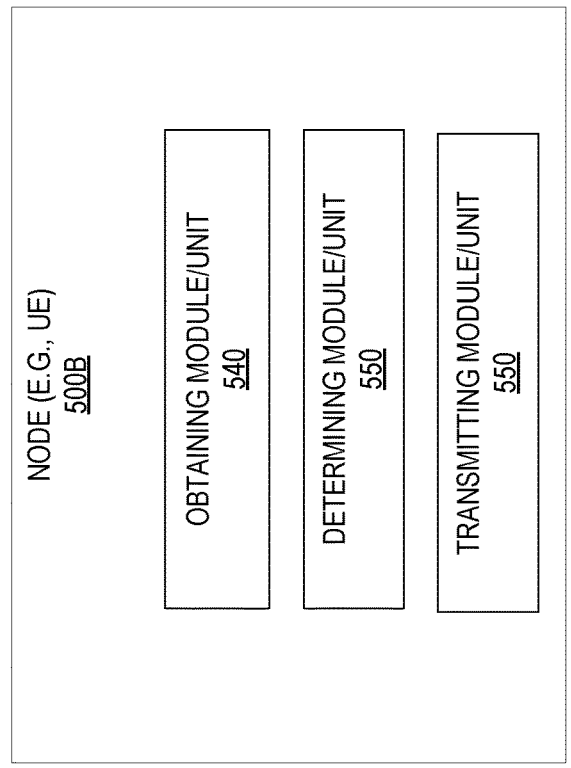
FIG. 10B is a block diagram of a node configured for use in a communication network according to other embodiments.
Figure 10A:
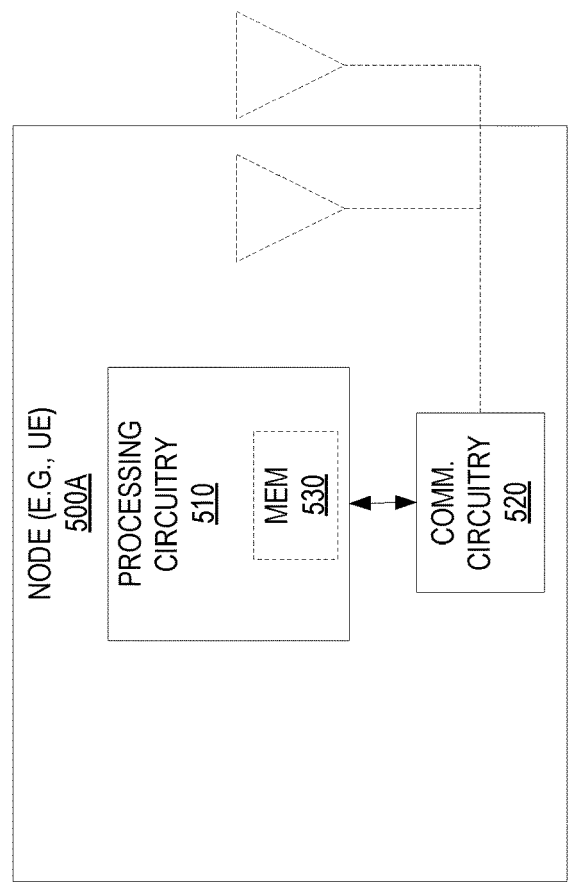
FIG. 10A is a block diagram of a node configured for use in a communication network according to some embodiments.

FIG. 10A illustrates additional details of a node 100 or 200 in accordance with one or more embodiments, shown generally as node 500A. As shown, the node 500A includes processing circuitry 510 and communication circuitry 520. Where the node 500A is a radio node, the communication circuitry 520 may comprise radio circuitry and may be configured to transmit and/or receive via one or more antennas that are internal and/or external to the node 500A. The processing circuitry 510 is configured to perform processing described above, e.g., in FIGS. 3A-3B and/or 4, such as by executing instructions stored in memory 530. The processing circuitry 510 in this regard may implement certain functional means or units.

FIG. 10B in this regard illustrates additional details of a node 100 or 200 in accordance with one or more other embodiments, shown generally as node 500B. Specifically, the node 500B may include an obtaining unit or module 540 for obtaining a message with a source address and a destination address. The node 500B may also include a determining unit or module 550 for performing the determining in FIGS. 3A-3B and/or 4. The node 500B may further include a transmitting unit or module 550 for selectively transmitting the message on a backward route that is the reverse of the forward route, depending on the determining. One or more of these modules or units may be implemented by the processing circuitry 510 in FIG. 10A.

Those skilled in the art will also appreciate that embodiments herein further include corresponding computer programs.

A computer program comprises instructions which, when executed on at least one processor of a node 100, 200, cause the node 100, 200 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Still other embodiments herein include a method performed by a node configured for use in a communication network (e.g., a mesh network). The method comprises obtaining a message with a source address and a destination address. The method also comprises determining whether the message is a type of message that is sent in response to a different message routed over a forward route from the destination address to the source address. The method also comprises selectively transmitting the message on a backward route that is the reverse of the forward route, depending on the determining.

In some embodiments, the method further comprises determining the type of the message based on one or more header fields of the message. The header field(s) may for instance be unencrypted, e.g., to allow the node to read the field(s) upon interception of the message.

In some embodiments, determining whether the message is a type of that is sent in response to a different message routed from the destination address to the source address comprises determining whether the message is an acknowledgement message that positively or negatively acknowledges the different message.

In some embodiments, the forward route is established by a first protocol layer of the node, and a second protocol layer of the node that is lower than the first protocol layer determines whether to transmit the message on the backward route. In one embodiment, for example, the first protocol layer is an Upper Transport layer according to a Bluetooth Mesh protocol and the second protocol layer is a Network layer according to the Bluetooth Mesh protocol.

In any of these embodiments, the message may be a message of a Lower Transport Layer according to a Bluetooth Mesh Protocol. Alternatively or additionally, the message may be a Segment Acknowledgement that positively or negatively acknowledges a segmented message of a Lower Transport Layer according to a Bluetooth Mesh Protocol.

In some embodiments, the method further comprises preferentially transmitting the message on a forward route from the source address to the destination address, instead of the backward route, if the forward route from the source address to the destination address has been established.

Alternatively or additionally, the method may further comprise determining the backward route by reversing the established forward route from the destination address to the source address, instead of performing discovery of the backward route.

In some embodiments, the method further comprises refraining from storing the backward route in a routing table.

In some embodiments, selectively transmitting the message comprises transmitting the message on the backward route responsive to determining that the message is said type of message, and that the forward route from the destination address to the source address has been previously established.

In some embodiments, selectively transmitting the message may comprise transmitting comprises transmitting the message on the backward route, or flooding the message, depending on the determining. In other embodiments, selectively transmitting the message may comprise transmitting the message on the backward route, or discarding the message, depending on the determining.

In some embodiments, the node is addressed by the source address. In this case, obtaining the message may comprise generating the message in response to the node receiving the different message from the destination address.

In other embodiments, the node is an intermediate relay node that is addressed by neither the source address nor the destination address. In this case, obtaining the message may comprise receiving the message from another node and transmitting the message on the backward route may comprise relaying the message along the backward route.

Embodiments herein also include a node configured for use in a communication network. The node is configured to obtain a message with a source address and a destination address. The node is also configured to determine whether the message is a type of message that is sent in response to a different message routed over a forward route from the destination address to the source address. The node may also be configured to selectively transmit the message on a backward route that is the reverse of the forward route, depending on the determining.

The node may also be configured to perform the method of any of the embodiments above.

A node configured for use in a communication network according to other embodiments comprises communication circuitry and processing circuitry wherein the node is configured to obtain a message with a source address and a destination address, determine whether the message is a type of message that is sent in response to a different message routed over a forward route from the destination address to the source address, and selectively transmit the message on a backward route that is the reverse of the forward route, depending on the determining.

The node may comprise communication circuitry and processing circuitry wherein the node is configured to perform the method of any of the embodiments above.

Embodiments further include a computer program comprising instructions which, when executed by at least one processor of a node, causes the node to carry out the method of any of the embodiments above. Other embodiments include a carrier containing such a computer program. The carrier may be one of an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a node configured for use in a communication network, the method comprising:
    obtaining a message with a source address and a destination address;
    determining whether the message is a type of message that is sent in response to a different message routed from the destination address to the source address, and whether a forward route from the destination address to the source address has been established; and
    selectively transmitting the message on a backward route that is the reverse of the forward route, depending on the determining,
    wherein the forward route is established by a first protocol layer of the node, and wherein a second protocol layer of the node that is lower than the first protocol layer determines whether to transmit the message on the backward route.

2. The method of claim 1, further comprising determining the type of the message based on one or more header fields of the message.

3. The method of claim 1, wherein said determining comprises determining whether the message is an acknowledgement message that positively or negatively acknowledges the different message.

4. The method of claim 1, wherein the first protocol layer is an Upper Transport layer according to a Bluetooth Mesh protocol and the second protocol layer is a Network layer according to the Bluetooth Mesh protocol.

5. The method of claim 1, wherein the message is a message of a Lower Transport Layer according to a Bluetooth Mesh Protocol.

6. The method of claim 1, wherein the message is a Segment Acknowledgement that positively or negatively acknowledges a segmented message of a Lower Transport Layer according to a Bluetooth Mesh Protocol.

7. The method of claim 1, further comprising determining the backward route by reversing the established forward route from the destination address to the source address, instead of performing discovery of the backward route.

8. The method of claim 1, wherein said selectively transmitting comprises transmitting the message on the backward route responsive to determining that the message is said type of message, and that the forward route from the destination address to the source address has been established.

9. The method of claim 1, wherein said selectively transmitting comprises transmitting the message on the backward route, or flooding the message, depending on the determining.

10. The method of claim 1, wherein the node is addressed by the source address, and wherein obtaining the message comprises generating the message in response to the node receiving the different message from the destination address.

11. The method of claim 1, wherein the node is an intermediate relay node that is on the forward route and the backward route and that is addressed by neither the source address nor the destination address, wherein obtaining the message comprises receiving the message from another node and wherein transmitting the message on the backward route comprises relaying the message along the backward route.

12. A node configured for use in a communication network, the node comprising communication circuitry and processing circuitry wherein the node is configured to:
 obtain a message with a source address and a destination address;
 determine whether the message is a type of message that is sent in response to a different message routed from the destination address to the source address, and whether a forward route from the destination address to the source address has been established; and
 selectively transmit the message on a backward route that is the reverse of the forward route, depending on the determining,
 wherein the forward route is established by a first protocol layer of the node, and wherein a second protocol layer of the node that is lower than the first protocol layer determines whether to transmit the message on the backward route.

13. A non-transitory computer readable storage medium storing computer executable instructions that, when executed by a node configured for use in a communication network, configures the node to:
 obtain a message with a source address and a destination address;
 determine whether the message is a type of message that is sent in response to a different message routed from the destination address to the source address, and whether a forward route from the destination address to the source address has been established; and
 selectively transmit the message on a backward route that is the reverse of the forward route, depending on the determining,
 wherein the forward route is established by a first protocol layer of the node, and wherein a second protocol layer of the node that is lower than the first protocol layer determines whether to transmit the message on the backward route.

* * * * *